United States Patent
Yoneno (10) Patent No.: US 12,388,963 B2
(45) Date of Patent: Aug. 12, 2025

(54) IMAGE DISPLAY SYSTEM AND IMAGE DISPLAY METHOD

(71) Applicant: SEIKO EPSON CORPORATION, Tokyo (JP)

(72) Inventor: Kunio Yoneno, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 574 days.

(21) Appl. No.: 17/851,780

(22) Filed: Jun. 28, 2022

(65) Prior Publication Data

US 2023/0007217 A1 Jan. 5, 2023

(30) Foreign Application Priority Data

Jul. 1, 2021 (JP) .................... 2021-110102

(51) Int. Cl.
*G03B 21/14* (2006.01)
*H04N 9/31* (2006.01)
*H04N 23/67* (2023.01)
*H04N 23/81* (2023.01)

(52) U.S. Cl.
CPC ......... *H04N 9/3155* (2013.01); *H04N 23/671* (2023.01); *H04N 23/81* (2023.01)

(58) Field of Classification Search
CPC .............................. H04N 9/3194; G03B 21/14
See application file for complete search history.

(56) References Cited

U.S. PATENT DOCUMENTS

| | | | |
|---|---|---|---|
| 2001/0030640 A1* | 10/2001 | Yoneno | G06F 3/033 345/157 |
| 2006/0158616 A1* | 7/2006 | Borger | G06F 3/0304 353/69 |
| 2010/0157254 A1 | 6/2010 | Ishii | |
| 2010/0245685 A1 | 9/2010 | Onodera et al. | |
| 2016/0077651 A1 | 3/2016 | Na et al. | |
| 2017/0244943 A1 | 8/2017 | Saito et al. | |

FOREIGN PATENT DOCUMENTS

| | | |
|---|---|---|
| JP | 2009-64110 A | 3/2009 |
| JP | 2011-227682 A | 11/2011 |
| JP | 2011-227683 A | 11/2011 |
| JP | 2014-41360 A | 3/2014 |
| JP | 2017-146927 A | 8/2017 |
| JP | 2017-531388 A | 10/2017 |
| JP | 2021-051760 A | 4/2021 |

* cited by examiner

*Primary Examiner* — Ryan D Howard
(74) *Attorney, Agent, or Firm* — Dority & Manning, P.A.

(57) ABSTRACT

An image display system includes a projector projecting image light onto a projection surface, at least one camera picking up at least one image of the projection surface and thus acquiring at least one picked-up image, at least one microphone detecting a sound generated in an image pickup range of the camera, and a control device controlling a position or an orientation of an image displayed on the projection surface by the image light, based on the at least one picked-up image, when a target sound is detected based on the sound.

9 Claims, 6 Drawing Sheets

IMAGE DISPLAY SYSTEM AND IMAGE DISPLAY METHOD

The present application is based on, and claims priority from JP Application Serial Number 2021-110102, filed Jul. 1, 2021, the disclosure of which is hereby incorporated by reference herein in its entirety.

BACKGROUND

1. Technical Field

The present disclosure relates to an image display system and an image display method.

2. Related Art

JP-A-2011-227683 discloses a technique of operating a projector, based on a tap sound generated by a user tapping a table or the like. JP-A-2021-51760 discloses a technique of using a sound generated by a user tapping a table or the like, as an audio input for rotating a projection image projected on the table.

In the techniques of JP-A-2011-227683 and JP-A-2021-51760, the timing when the table is tapped can be detected by detecting the tap sound, but it is difficult to detect the position where the tap sound is generated on the table. Therefore, it is difficult to control the position or the orientation of a display image projected on the table, solely based on the tap sound.

SUMMARY

An image display system according to an aspect of the present disclosure includes a projector projecting image light, an image pickup element picking up an image of a projection surface, a detector detecting a target sound generated in an image pickup range of the image pickup element, and a controller controlling a position or an orientation of a display image displayed on the projection surface by the image light. The controller performs an adjustment of the position or the orientation of the display image, based on the picked-up image of the projection surface acquired from the image pickup element, when the target sound is detected by the detector.

DESCRIPTION OF EXEMPLARY EMBODIMENTS

An embodiment of the present disclosure will now be described with reference to the drawings.

In the drawings described below, in order to make each component easier to view, the dimensions may not be to scale depending on the component.

First Embodiment

Figure 1:
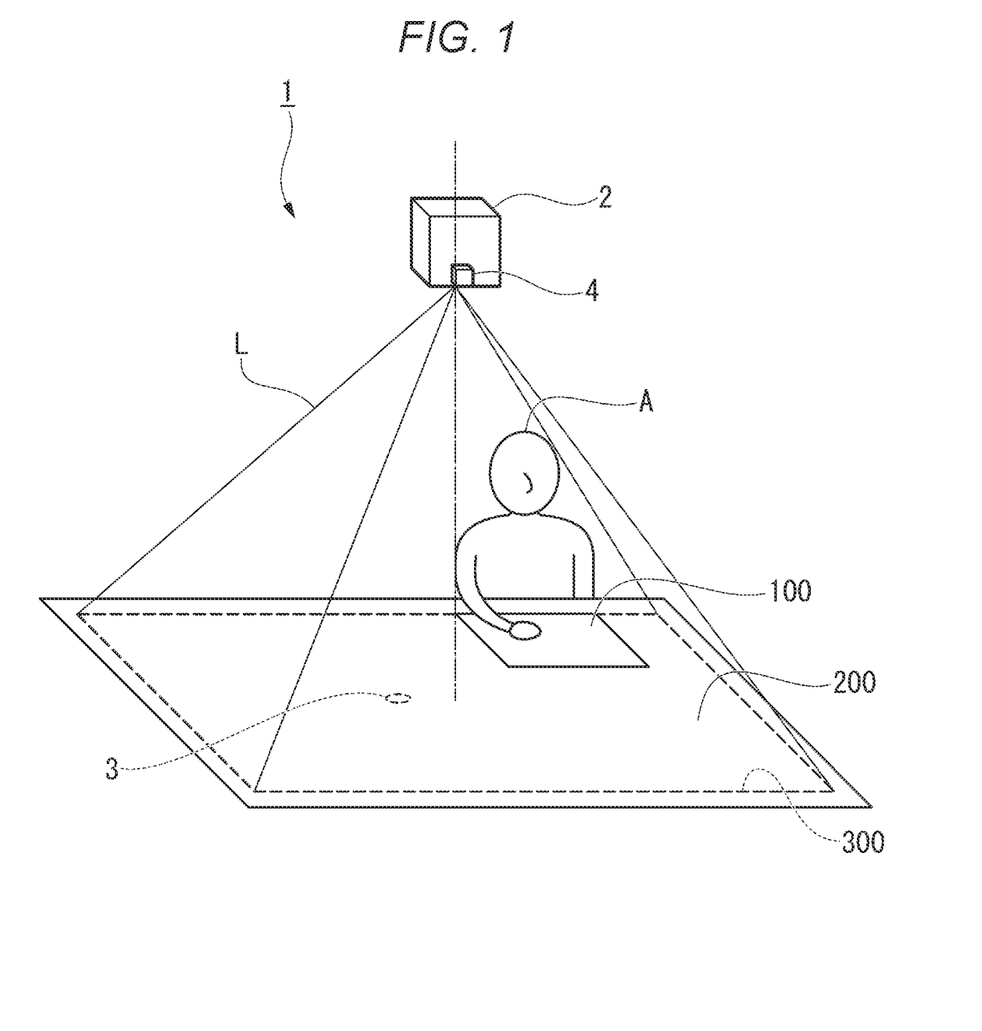
FIG. 1 schematically shows an overview of an image display system according to a first embodiment.
Figure 2:
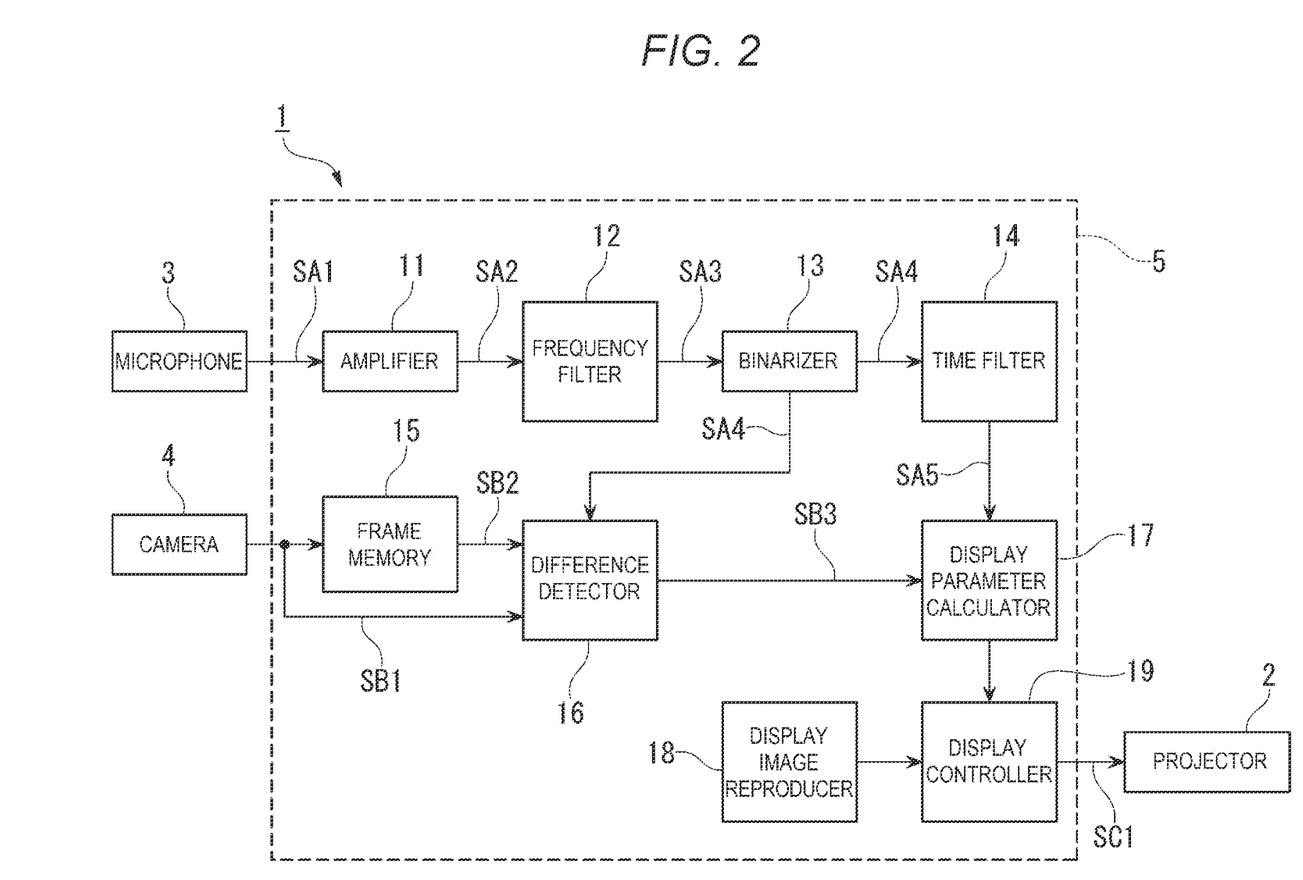
FIG. 2 is a functional block diagram showing the configuration of the image display system according to the first embodiment.

FIG. 1 schematically shows an overview of an image display system 1 according to a first embodiment of the present disclosure. FIG. 2 is a functional block diagram showing the configuration of the image display system 1 according to the first embodiment. As shown in FIGS. 1 and 2, the image display system 1 has a projector 2, a microphone 3, a camera 4, and a control device 5. The projector 2 is an example of a projector. The microphone 3 is an example of a detector. The camera 4 is an example of an image pickup element. The control device 5 is an example of a controller. While the control device 5 is not illustrated in FIG. 1, the control device 5 may be built in the casing of the projector 2 or may be provided outside the projector 2.

The projector 2 is a projection-type display device that projects image light L based on an image control signal SC1 outputted from the control device 5. A projection surface 200, which is a surface where the image light L is projected, is the top surface of a flat top board of a desk or a table, for example. In an example, the projection surface 200 is a rectangular surface having two long sides and two short sides. The projector 2 is arranged directly above the center of the projection surface 200 and projects the image light L toward the projection surface 200 from the position of arrangement.

Although not illustrated, the projector 2 has an electro-optical device that emits the image light L based on the image control signal SC1, and a projection system that projects the image light L emitted from the electro-optical device, in an enlarged form. The electro-optical device is, for example, a self-emitting electro-optical device such as an organic EL (electroluminescence) panel. The self-emitting electro-optical device is a device that generates light by itself, using electrical energy provided from outside, without needing a light source such as a backlight. The electro-optical device may be a non-self-emitting electro-optical device such as a liquid crystal panel, which needs a light source. The projection system includes optical elements such as a lens, a mirror, and a prism.

Based on the image control signal SC1 outputted from the control device 5, the timing of light emission and the luminance of light emission of all the pixels provided in the electro-optical device are controlled. For example, the image control signal SC1 includes a horizontal synchronization signal, a vertical synchronization signal, and an RGB signal or the like. The RGB signal includes a signal setting the luminance of light emission of a red pixel, a signal setting the luminance of light emission of a green pixel, and a signal setting the luminance of light emission of a blue pixel. The image light L emitted from the electro-optical device includes color light emitted from the pixels emitting the light with the luminance of light emission set by the RGB signal.

As the image light L, generated by the electro-optical device is projected in an enlarged form on the projection surface 200 by the projection system as described above, a display image 100 visible to a user A is displayed on the projection surface 200. The size of a projection area 300, which is a rectangular area where the image light L is projected, in an in-plane area of the projection surface 200, varies depending on the optical characteristics of the projection system and the distance from the projection surface 200 to the projector 2, or the like. In an example, the size of the projection area 300 is set in such a way that the four sides of the projection area 300 are located about several centimeters inward from the four sides of the projection surface 200.

Controlling the position and number of pixels to emit light in the electro-optical device enables the display image 100 to be displayed in a desired size at a desired position in the projection area 300. In an example, the rectangular display image 100 approximately in A4 size or B4 size is displayed near the hand of the user A seated facing one of the two long sides of the projection surface 200, as shown in FIG. 1. For example, when all the pixels in the electro-optical device emit light, the display image 100 is displayed over the entire projection area 300. That is, when all the pixels in the electro-optical device emit light, the display image 100 in the same size as the projection area 300 is displayed on the projection surface 200.

The microphone 3 detects a sound generated on the projection surface 200, where the image light L is projected. For example, when the projection surface 200 is the top surface of the top board of a desk or a table, the microphone 3 is attached in tight contact with the back surface of the top board. As the microphone 3 is attached to the back surface of the top board, when the user A taps the projection surface 200, for example, with the second joint of the middle finger of the right hand, the microphone 3 can detect a vibration sound generated by the tap. The microphone 3 outputs a sound wave signal SA1 representing the result of detecting the sound generated on the projection surface 200 to the control device 5 via a signal cable, not illustrated.

The position where the microphone 3 is attached is not limited to the back surface of the top board. For example, the microphone 3 may be attached to a structural member at the back side of the top board or may be attached at a position that does not overlap the projection area 300 at an edge of the projection surface 200. The number of microphones 3 may be one or plural.

The camera 4 is, for example, a digital camera such as a CCD (charge-coupled device) camera and picks up an image of the projection surface 200. In an example, the camera 4 is attached to the casing of the projector 2. That is, the camera 4 is arranged directly above the center of the projection surface 200 and picks up an image of the projection surface 200 from the position of arrangement. The camera 4 outputs picked-up image data SB1 representing the picked-up image by the projection surface 200 to the control device 5 via a signal cable, not illustrated. When the entirety of the projection surface 200 cannot fit within the angle of view of one camera 4, a plurality of cameras 4 may be used to pick up an image of the projection surface 200. In this embodiment, the image pickup range of the camera 4 is the entirety of the projection surface 200. The image pickup range of the camera 4 may be the projection area 300.

The control device 5 controls the display state of the display image 100 displayed on the projection surface 200 by the image light L, based on the sound wave signal SA1 outputted from the microphone 3 and the picked-up image data SB1 outputted from the camera 4. The display state of the display image 100 includes not only the content of the display image 100 but also the size, position, and orientation or the like of the display image 100. In this embodiment, the size of the display image 100 is fixed to about A4 size or B4 size, as shown in FIG. 1, and the position and orientation of the display image 100 in the projection area 300 are controlled based on the sound wave signal SA1 and the picked-up image data SB1. While, in this embodiment, both the position and orientation of the display image 100 are controlled based on the sound wave signal SA1 and the picked-up image data SB1, this is not limiting. Only the position of the display image 100 or only the orientation of the display image 100 may be controlled based on the sound wave signal SA1 and the picked-up image data SB1.

Although not described in detail in this embodiment, the user A not only can view the content of the display image 100 displayed near the user A's own hand but also can hold the hand over the display image 100 to execute a predetermined operation such as a page turning operation or a writing operation and thus can turn a page of the display image 100 or write something on the display image 100. That is, the user A can switch the display content or write something by a hand gesture. However, when the user A moves to another position along the edge or the side of the projection surface 200 after the display image 100 is displayed near the hand of the user A, it is difficult for the user A to not only view the content of the display image 100 but also execute a predetermined operation such as a page turning operation or a writing operation on the display image 100.

To cope with this, in this embodiment, the system is configured in such a way that, when the user A taps the projection surface 200 according to a predetermined rule, the position and orientation of the display image 100 displayed on the projection surface 200 are controlled to be an appropriate display position and orientation corresponding to the position of the user A. In order to implement adaptive control on the display image 100 as described above, the control device 5 in this embodiment has a function of adjusting the position and orientation of the display image 100, based on the picked-up image of the projection surface 200 acquired from the camera 4, when a target sound is detected by the microphone 3.

The target sound in this embodiment is a sound generated by the user A to control the operation of the projector 2 and is a sound generated by the user A within the image pickup range of the camera 4. In an example, the target sound is a sound generated when the user A taps the projection surface 200 with, for example, the second joint of the middle finger of the right hand. The control device acquires, as the target sound, a frequency component included in a predetermined frequency band, of the frequency components included in the sound detected by the microphone 3, that is, the sound wave signal SA1. In the description below, the target sound may be referred to as a tap sound. The control device 5 recognizes a time point when the volume of the tap sound exceeds a predetermined threshold, as a time point when the tap sound is detected.

In this embodiment, when the tap sound is detected a predetermined number of times within a first predetermined time period TA, the control device 5 adjusts the position and orientation of the display image 100, based on the picked-up image, that is, the picked-up image data SB1. More specifically, when the second tap sound is detected within the first predetermined time period TA from the detection of the first tap sound, the control device 5 adjusts the position and orientation of the display image 100, based on the picked-up image. When the third tap sound is detected within a second predetermined time period TB from the detection of the second tap sound, the control device 5 does not adjust the position and orientation of the display image 100.

In this embodiment, the control device 5 adjusts the position and orientation of the display image 100, based on a difference image acquired from the picked-up image. Specifically, the control device 5 calculates a centroid position of the difference image and adjusts the position of the display image 100, based on the centroid position. The control device 5 also determines the position of the user A, based on the centroid position of the difference image, and adjusts the orientation of the display image 100, based on the result of determining the position of the user A.

The specific configuration and operation of the control device 5 having the above functions will now be described.

As shown in FIG. 2, the control device 5 has an amplifier 11, a frequency filter 12, a binarizer 13, a time filter 14, a frame memory 15, a difference detector 16, a display parameter calculator 17, a display image reproducer 18, and a display controller 19. The sound wave signal SA1 outputted from the microphone 3 is inputted to the amplifier 11. The picked-up image data SB1 outputted from the camera 4 is inputted to the frame memory 15 and the difference detector 16.

The amplifier 11 is, for example, an amplifying circuit such as an ampler and amplifies the sound wave signal SA1 inputted from the microphone 3. The amplifier 11 outputs an amplified sound wave signal SA2 acquired by amplifying the sound wave signal SA1, to the frequency filter 12.

The frequency filter 12 is a filter that passes a frequency component included in a predetermined frequency band, of the frequency components included in the amplified sound wave signal SA2 inputted from the amplifier 11, as a frequency component equivalent to the tap sound (target sound). For example, when a low-pass filter is used as the frequency filter 12, a cutoff frequency may be set in such a way as to pass a frequency component lower than 350 Hz, which is a formant frequency of male voice. As the cutoff frequency is set in this way, the frequency filter 12 can damp a relatively high frequency component such as a voice of conversation by the user A, a sound generated by metal legs of chairs hitting each other, or a sound generated by an ID card suspended from the neck of the user A hitting a button on the clothing, and can selectively pass the frequency component equivalent to the tap sound on the projection surface 200. A signal including the frequency component passed through the frequency filter 12 is outputted as tap sound signal SA3 to the binarizer 13. Also, a band-pass filter that can pass the frequency component equivalent to the tap sound on the projection surface 200 can be used as the frequency filter 12.

The binarizer 13 converts the tap sound signal SA3 inputted from the frequency filter 12 into a binary signal SA4, which is a signal that can have binary values of high level and low level, and outputs the binary signal SA4 to the time filter 14 and the difference detector 16. Specifically, the binarizer 13 compares the tap sound signal SA3 with a predetermined threshold level Vh. When the tap sound signal SA3 exceeds the threshold level Vh, the binarizer 13 sets the level of the binary signal SA4 to high level for a duration tw. That is, the binarizer 13 outputs a one-shot pulse having the predetermined duration tw when the volume of the tap sound exceeds the predetermined threshold.

In an example, the binarizer 13 having the functions as described above can be implemented by a comparator and a one-shot multivibrator. The comparator compares the tap sound signal SA3 with the threshold level Vh and outputs a signal representing the result of the comparison to the one-shot multivibrator. The comparator outputs a high-level signal when the tap sound signal SA3 exceeds the threshold level Vh. The one-shot multivibrator outputs a one-shot pulse having the duration tw decided by an externally attached circuit element such as a resistance element, when the signal inputted from the comparator changes from low level to high level. The output signal from the one-shot multivibrator is the binary signal SA4.

Figure 3:
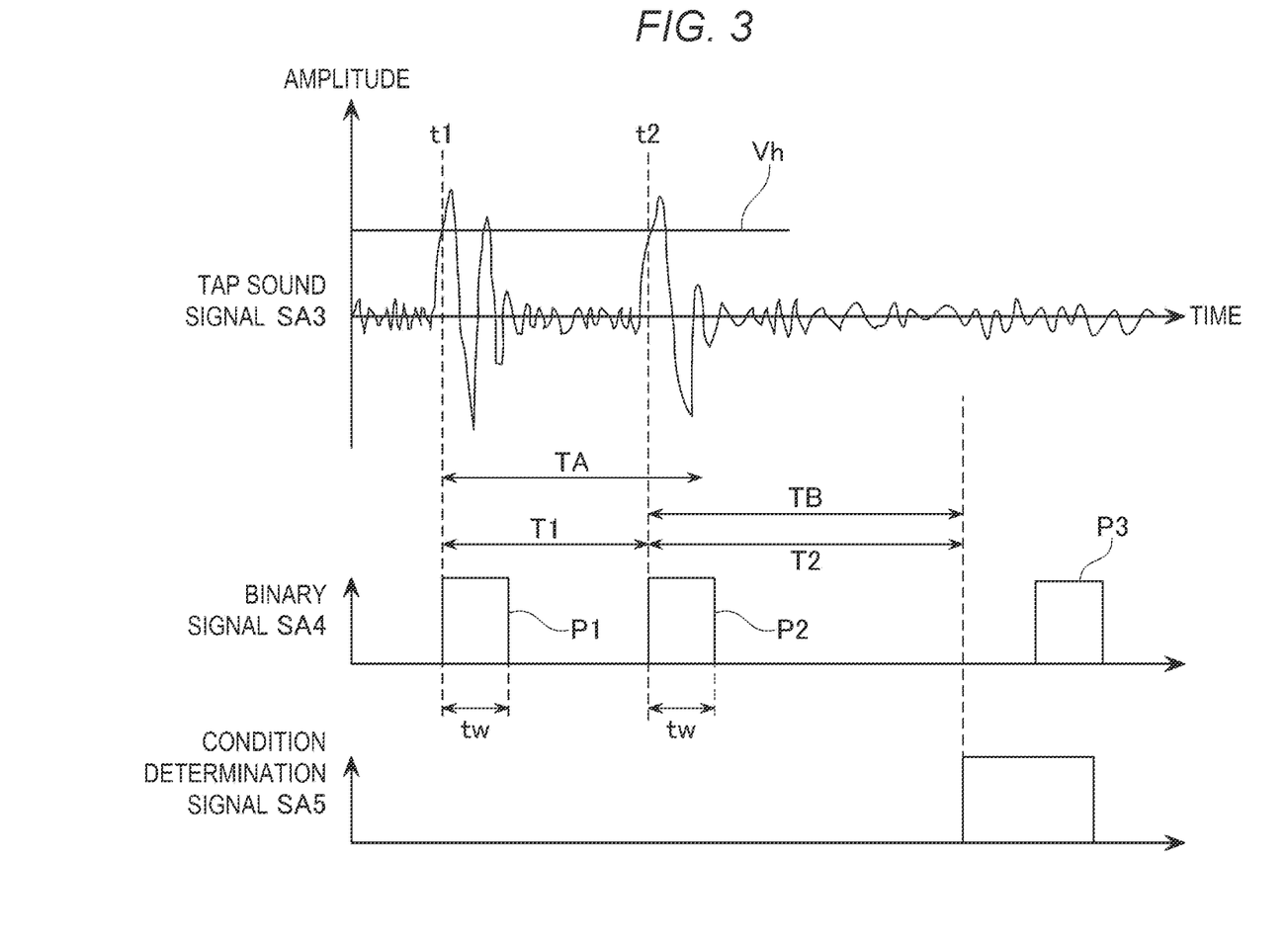
FIG. 3 is an explanatory view for explaining the functions of a binarizer and a time filter.

As shown in FIG. 3, for example, when the user A taps the projection surface 200 twice successively, a part with an increased amplitude (volume of the tap sound) is generated twice successively in the tap sound signal SA3, due to the occurrence of the two successive tap sounds. In FIG. 3, at a time point t1, the tap sound signal SA3 exceeds the threshold level Vh due to the first tap sound. At a time point t2, the tap sound signal SA3 exceeds the threshold level Vh due to the second tap sound. As described above, the control device 5 recognizes the time point when the volume of the tap sound exceeds the predetermined threshold, as the time point when the tap sound is detected.

In the example shown in FIG. 3, the binarizer 13 sets the level of the binary signal SA4 to high level for the duration tw from the time point t1 and sets the level of the binary signal SA4 to high level for the duration tw from the time point t2. In other words, the binarizer 13 outputs a first one-shot pulse P1 having the duration tw at the time point t1, when the tap sound signal SA3 exceeds the threshold level Vh due to the first tap sound, and outputs a second one-shot pulse P2 having the duration tw at the time point t2, when the tap sound signal SA3 exceeds the threshold level Vh due to the second tap sound. Because of the characteristics of the one-shot multivibrator, the output level of the one-shot multivibrator, that is, the level of the binary signal SA4, does not change even when the tap sound signal SA3 exceeds the threshold level Vh successively within the duration tw.

The time filter 14 determines whether the binary signal SA4 inputted from the binarizer 13 satisfies a predetermined condition or not, and outputs a condition determination signal SA5 representing the result of the determination to the display parameter calculator 17. Specifically, as shown in FIG. 3, the time filter 14 outputs an active-level signal, for example, a high-level signal, as the condition determination signal SA5, when the second one-shot pulse P2 is generated within the first predetermined time period TA from the generation of the first one-shot pulse P1 and a third one-shot pulse P3 is not generated within the second predetermined time period TB from the generation of the second one-shot pulse P2. Meanwhile, the time filter 14 outputs an inactive-level signal, for example, a low-level signal, as the condition determination signal SA5, when the second one-shot pulse P2 is generated within the first predetermined time period TA from the generation of the first one-shot pulse P1 and the third one-shot pulse P3 is generated within the second predetermined time period TB from the generation of the second one-shot pulse P2.

The time filter 14 measures a first time period T1 from the rising edge of the first one-shot pulse P1 to the rising edge of the second one-shot pulse P2. In the example shown in FIG. 3, the time filter 14 measures the time period from the time point t1 to the time point t2 as the first time period T1. The time filter 14 starts measuring a second time period T2, triggered by the rising edge of the second one-shot pulse P2, and monitors whether or not a rising edge, that is, the third one-shot pulse P3, is generated in the binary signal SA4 before the second time period T2 reaches the second predetermined time period TB.

The time filter 14 outputs an active-level signal as the condition determination signal SA5, when the first time period T1 from the rising edge of the first one-shot pulse P1 to the rising edge of the second one-shot pulse P2 is shorter than the first predetermined time period TA and the third one-shot pulse P3 is not generated in the binary signal SA4 before the second time period T2 reaches the second predetermined time period TB. Meanwhile, the time filter 14 outputs an inactive-level signal as the condition determination signal SA5, when the first time period T1 from the rising edge of the first one-shot pulse P1 to the rising edge of the second one-shot pulse P2 is shorter than the first predetermined time period TA and the third one-shot pulse P3 is generated in the binary signal SA4 before the second time period T2 reaches the second predetermined time period TB.

As described above, the time filter 14 outputs an active-level signal as the condition determination signal SA5, when the second tap sound is detected within the first predetermined time period TA from the detection of the first tap sound and the third tap sound is not detected within the second predetermined time period TB from the detection of the second tap sound. Otherwise, the time filter 14 outputs an inactive-level signal as the condition determination signal SA5.

In an example, it is assumed that the first predetermined time period TA is set to 1.2 seconds, that the second predetermined time period TB is set to 1 second, and that the duration tw is set to 0.2 seconds. In this case, when the user A taps the projection surface 200 to generate the first tap sound and then generates the second tap sound within a period of 0.2 seconds or longer and shorter than 1.2 seconds and 1 second passes without the user A generating the third tap sound, an active-level signal is outputted as the condition determination signal SA5 from the time filter 14. In such a configuration, an active-level signal is not outputted from the time filter 14 when the tap sound is generated in a pattern deviating from a predetermined rule.

That is, in this embodiment, the predetermined rule for the user A is "to generate the second tap sound within the first predetermined time period TA from the generation of the first tap sound and not to generate the third tap sound within the second predetermined time period TB from the generation of the second tap sound".

The frequency filter 12, the binarizer 13, and the time filter 14 may be formed by hardware including an analog circuit and a digital circuit or may be formed by software operating on a processor such as a CPU. In an example, the frequency filter 12 and the binarizer 13 may be formed by hardware based on an analog circuit and the time filter 14 may be formed by software.

The picked-up image data SB1 outputted from the camera 4 is inputted directly to the difference detector 16 and is also inputted to the difference detector 16 via the frame memory 15. In the description below, the picked-up image data SB1 inputted directly to the difference detector 16 from the camera 4 is referred to as first picked-up image data SB1, and the picked-up image data SB1 inputted to the difference detector 16 via the frame memory 15 is referred to as second picked-up image data SB2. Also, the binary signal SA4 outputted from the binarizer 13 is inputted to the difference detector 16.

Figure 4:
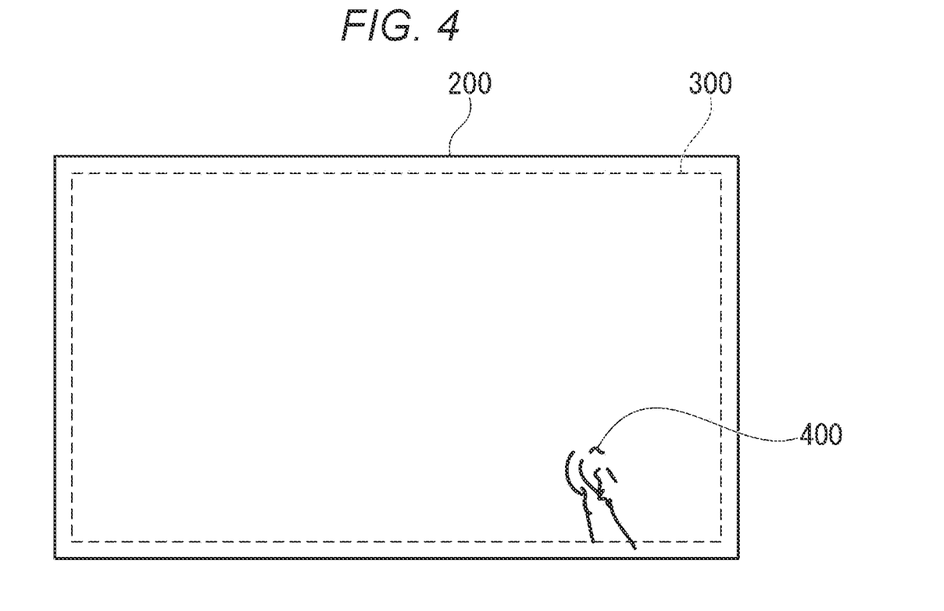
FIG. 4 shows an example of a difference image detected by a difference detector.

The difference detector 16 detects a difference image based on the first picked-up image data SB1 and the second picked-up image data SB2 during the time period between the first one-shot pulse P1 and the second one-shot pulse P2 appearing in the binary signal SA4. FIG. 4 shows an example of a difference image 400 detected by the difference detector 16. When the user A taps a desk twice with the right hand, the difference image 400 appears around the hand due to the movement of the hand. The difference detector 16 outputs difference image data SB3 representing the detected difference image 400 to the display parameter calculator 17. When a plurality of successive frames of difference images 400 are detected during the period between the first one-shot pulse P1 and the second one-shot pulse P2, for example, the difference image 400 having the maximum number of pixels where difference data is detected may be employed.

The difference image data SB3 outputted from the difference detector 16 and the condition determination signal SA5 outputted from the time filter 14 are inputted to the display parameter calculator 17. When the condition determination signal SA5 changes from low level to high level, the display parameter calculator 17 calculates the display, position and orientation of the display image 100 as a display parameter, based on the difference image 400 represented by the difference image data SB3. In other words, when the second tap sound is detected within the first predetermined time period TA from the detection of the first tap sound and the third tap sound is not detected within the second predetermined time period TB from the detection of the second cap sound, the display parameter calculator 17 calculates the display position and orientation of the display image 100, based on the difference image 400.

Figure 5:
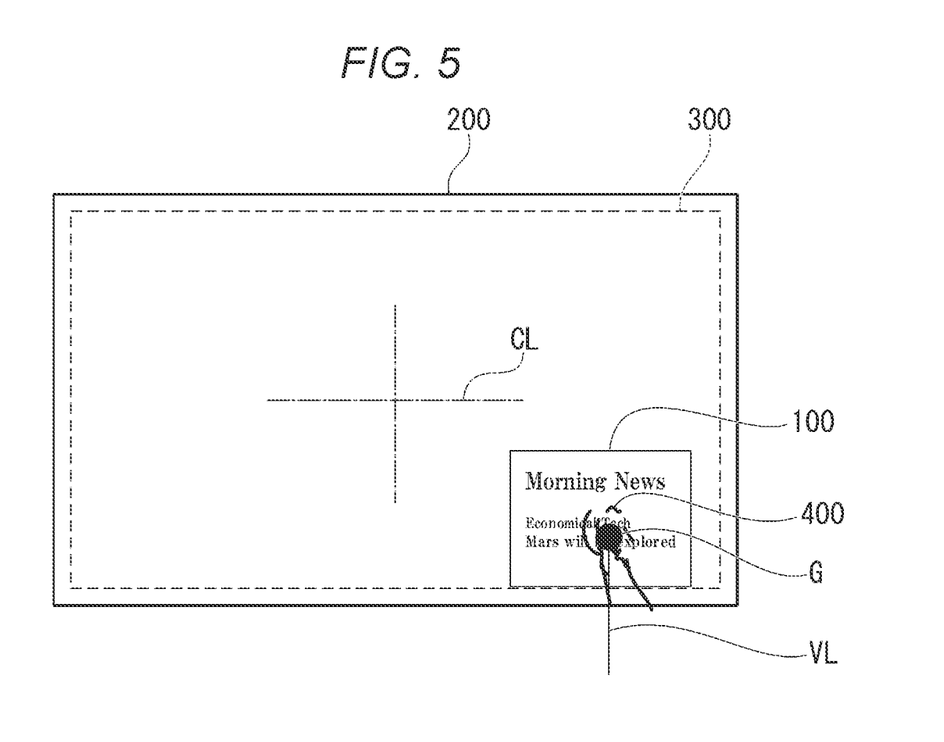
FIG. 5 is an explanatory view for explaining a process in which a display parameter calculator calculates a display position and an orientation of a display image, based on a difference image.

The process in which the dis lay parameter calculator 17 calculates the display position and orientation of the display image 100, based on the difference image 400, will now be specifically described, referring to FIG. 5.

As shown in FIG. 5, the display parameter calculator 17 first calculates a centroid position G from the difference image 400, then specifies the nearest side to the centroid position G of the four sides of the projection area 300, and draws a perpendicular line VL to the specified side from the centroid position G. In FIG. 5, the nearest side to the centroid position G is the lower long side.

The display parameter calculator 17 decides the display, position of the display image 100 in such a way that the center the horizontal orientation of the display image 100 coincides with the perpendicular line VL and that the lower end in the vertical orientation of the display image 100 coincides with the specified side of the projection area 300, that is, the nearest side to the centroid position G. Also, the display parameter calculator determines which position the user A is located in relation to a center line CL in the projection area 300, based on the positional relationship between the center line CL and the centroid position G, and decides the orientation of the display image 100, based on the result of determining the position of the user A. In the example shown in FIG. 5, the display parameter calculator decides the orientation of the display image 100 in such a way that the user A can view the display image 100 from the lower end side of the projection area 300.

The display parameter calculator 17 outputs the result of calculating the display parameter to the display controller 19. The display parameter includes the display position and orientation of the display image 100. In the description below, the display position of the display image 100 calculated by the display parameter calculator 17 may be referred to as a target display position and the orientation of the display image 100 calculated by the display, parameter calculator 17 may be referred to as a target display orientation.

The display controller 19 generates an Image control signal SC1 and outputs the image control signal SC1 to the projector 2 in such a way that an image reproduced by the display image reproducer 18 is displayed as the display image 100 at the target display position in the projection area 300 and in the state of facing the target display orientation, based on the result of calculating the display parameter acquired from the display parameter calculator 17. The display image reproducer 18 may reproduce an image, for example, based on image data stored in a recording medium such as a DVD (digital versatile disc), or may reproduce an image based on image data downloaded from a communication network such as the internet.

By the functions of the control device 5 as described above, the position and orientation of the display image 100 displayed on the projection surface 200 are adjusted to be an appropriate display position and orientation corresponding to the position of the user A when the user A taps the projection surface 200 according to a predetermined rule. More specifically, by the functions of the control device 5 as described above, the position and orientation of the display image 100 displayed on the projection surface 200 are adjusted to be an appropriate display position and orientation corresponding to the position of the user A, when the second tap sound is detected within the first predetermined time period TA from the detection of the first tap sound and the third tap sound is not detected within the second predetermined time period TB from the detection of the second tap sound.

When the display image 100 sticks out of the projection area 300 as a result of adjusting the position and orientation of the display image 100, the amount of sticking out may be found in advance, based on the size of the display image 100 and the size of the projection area 300, and the display position of the display image 100 may be corrected, based on the amount of sticking out.

As described above, in this embodiment, when the tap sound (target sound) is detected by the microphone 3, the control device 5 adjusts the position and orientation of the display image 100, based on the picked-up image of the projection surface 200 acquired from the camera 4.

According to this embodiment as described above, the position and orientation of the display image 100 displayed on the projection surface 200 are adjusted to be an appropriate display position and orientation corresponding to the position of the user A when the user A taps the projection surface 200 according to a predetermined rule. Thus, even when the user A moves to another position along the edge or the side of the projection surface 200 after the display image 100 is displayed near the hand of the user A, the user A not only can easily continue to view the content of the display image 100 but also can easily execute a predetermined operation such as a page turning operation or a writing operation to the display image 100.

In this embodiment, the control device 5 adjusts the position and orientation of the display image 100, based on the picked-up image, when the tap sound is detected a predetermined number of times within the first predetermined time period TA.

Thus, when the tap sound is generated in a pattern deviating from the rule that the tap sound is detected the predetermined number of times within the first predetermined time period TA, that is, when the user A generates an unintended tap sound, the position and orientation of the display, image 100 are not adjusted and therefore the display image 100 can be prevented from moving at a timing that is not intended by the user A.

In this embodiment, the control device 5 adjusts the position and orientation of the display image 100, based on the picked-up image, when the second tap sound is detected within the first predetermined time period TA from the detection of the first tap sound.

Thus, when the tap sound is generated in a pattern deviating from the rule that the second tap sound is detected within the first predetermined time period TA from the detection of the first tap sound, the position and orientation of the display image 100 are not adjusted and therefore the display image 100 can be prevented from moving at a timing that is not intended by the user A.

In this embodiment, the control device 5 does not adjust the position and orientation of the display image 100 when the third tap sound is detected within the second predetermined time period TR from the detection of the second tap sound.

Thus, when the tap sound is generated in a pattern deviating from the rule that the second tap sound is detected within the first predetermined time period TA from the detection of the first tap sound and that the third tap sound is not detected within the second predetermined time period TB from the detection of the second tap sound, the position and orientation of the display image 100 are not adjusted and therefore the display image 100 can be more securely prevented from moving at a timing that is not intended by the user A.

In this embodiment, the control device 5 acquires a frequency component included in a predetermined frequency band, of the frequency components included in the sound detected by the microphone 3, as the tap sound.

Thus, even when a noise sound included in a frequency band that does not correspond to the tap sound, which is the target sound, is detected by the microphone 3, the position and orientation of the display image 100 are not adjusted and therefore the display image 100 can be prevented from moving at a timing that is not intended by the user A.

In this embodiment, the control device 5 recognizes the time point when the volume of the tap sound exceeds a predetermined threshold, as the time point when the tap sound is detected.

Thus, when the volume of the tap sound does not exceed the predetermined threshold, the control device 5 does not recognize that the tap sound is detected, and the position and orientation of the display image 100 are not adjusted. Therefore, the display image 100 can be prevented from moving at a timing that is not intended by the user A.

In this embodiment, the control device 5 adjusts the position and orientation of the display image 100, based on the difference image acquired from the picked-up image.

Thus, the position of the user A that is necessary for deciding the position and orientation of the display image 100 displayed on the projection surface 200 can be acquired accurately and easily.

In this embodiment, the control device 5 calculates the centroid position of the difference image and adjusts the position of the display image 100, based on the centroid position.

In this way, since the centroid position of the difference image, which can be regarded as the position of the fingertip of the user A tapping the projection surface 200, is calculated, the position of the display image 100 displayed on the projection surface 200 can be adjusted to be an appropriate display position corresponding to the position of the user A, particularly to the position of the fingertip.

In this embodiment, the control device 5 determines the position of the user A, based on the centroid position of the difference image, and adjusts the orientation of the display image 100, based on the result of determining the position of the user A.

In this way, since the position of the user A is determined based on the centroid position of the difference image and the orientation of the display image 100 is adjusted based on the result of determining the position of the user A, the orientation of the display image 100 displayed on the projection surface 200 can be adjusted to be an appropriate orientation corresponding to the position of the user A, particularly to the position along the edge of the projection surface 200.

Second Embodiment

Figure 6:
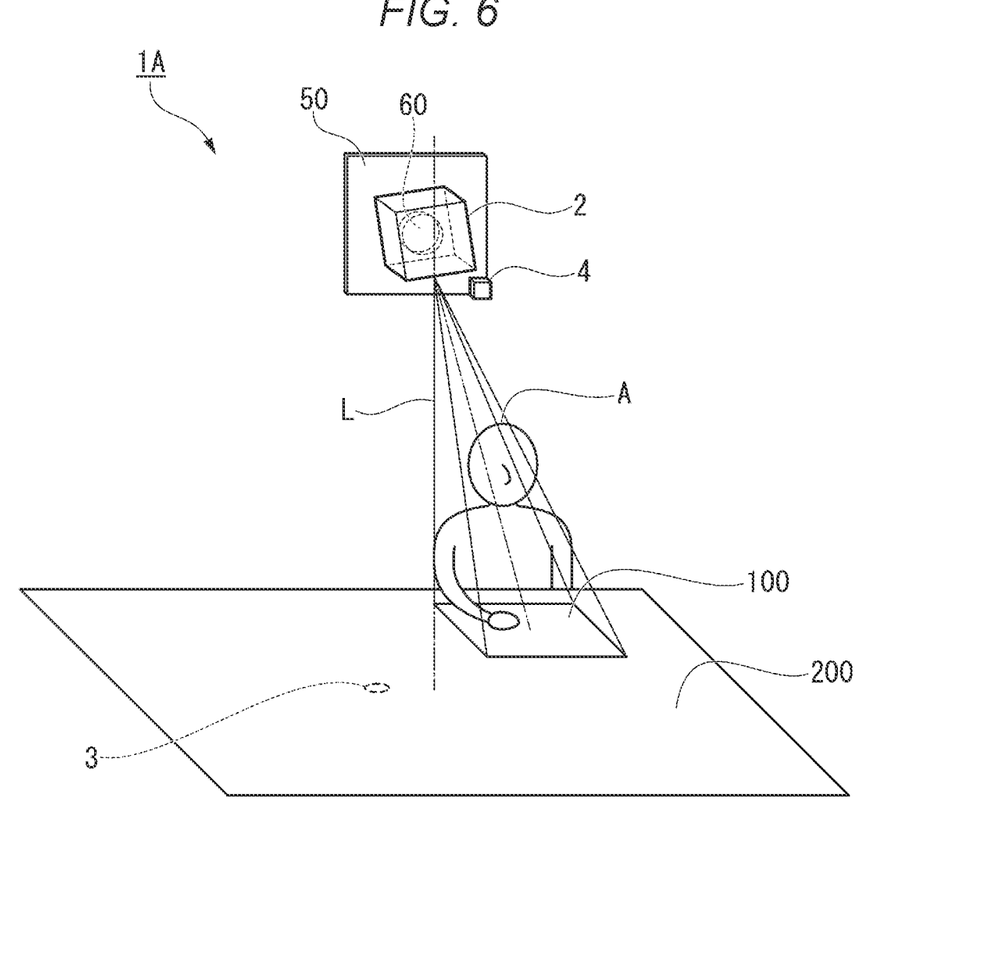
FIG. 6 schematically, shows an overview of an image display system according to a second embodiment.
Figure 7:
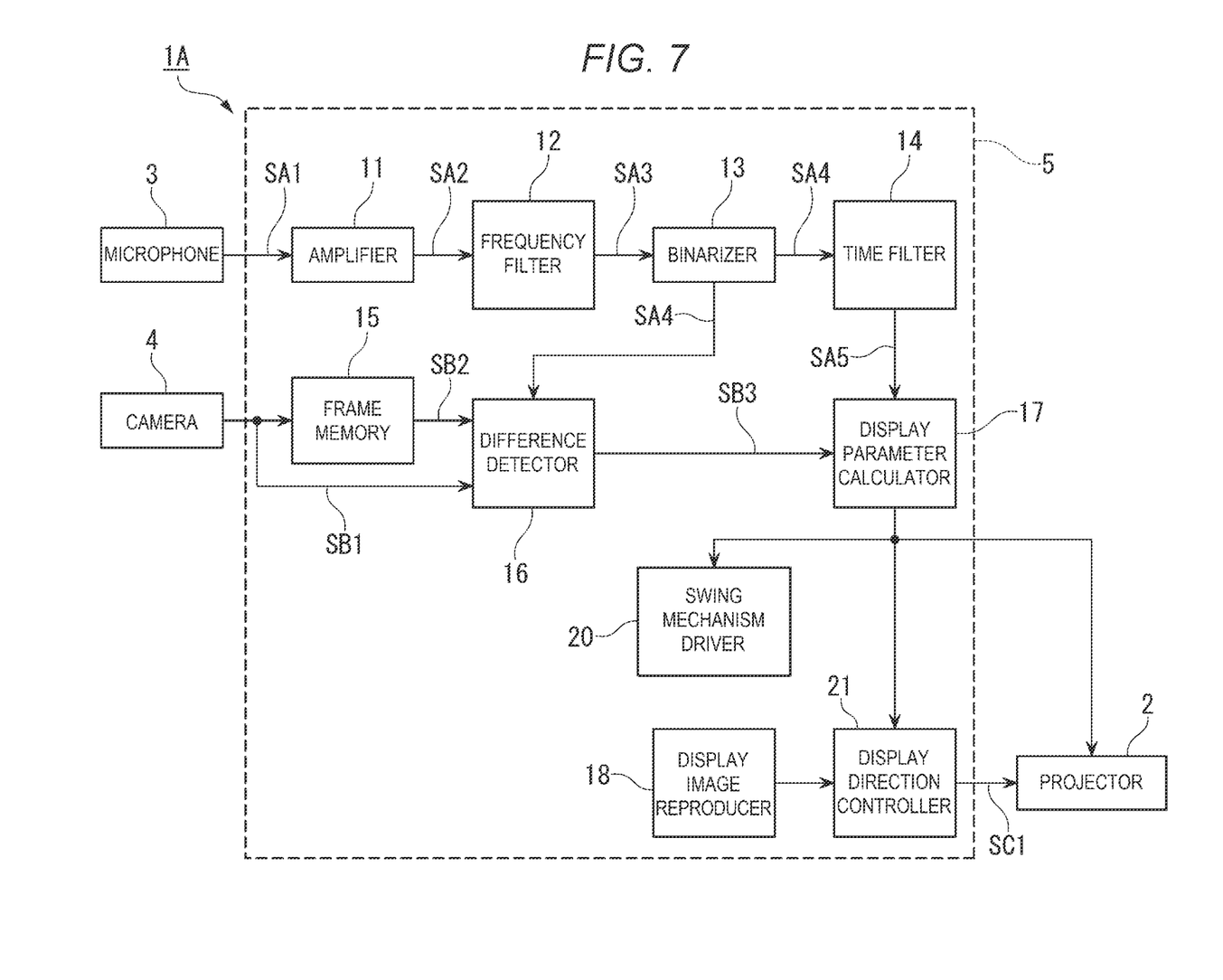
FIG. 7 is a functional block diagram showing the configuration of the image display system according to the second embodiment.

FIG. 6 schematically shows an overview of an image display system 1A according to a second embodiment of the present disclosure. FIG. 7 is a functional block diagram showing the configuration of the image display system. 1A according to the second embodiment. In FIGS. 6 and 7, the same components as the components of the image display system 1 according to the first embodiment, of the components of the image display system 1A according to the second embodiment, are denoted by the same reference signs. In the description below, different components from the components of the image display system 1 according to the first embodiment, of the components of the image display system 1A according to the second embodiment, are described and the description of the same components is omitted.

As shown in FIG. 6, in the image display system 1A according to the second embodiment, a stand 50 is provided via a frame or the like, not illustrated, above the center of the projection surface 200, and the projector 2 is arranged at the stand 50 via a swing mechanism 60 and is thus configured to be able to project the image light L at a free position on the entirety of the projection surface 200 as a screen in the second embodiment, the camera 4 is attached to the stand 50 as an example.

In this way, the projector 2 in the second embodiment has the swing mechanism 60 changing the direction of projection of the image light L. The swing mechanism 60 is an example of a projection direction changer. The control device 5 in the second embodiment controls the direction of projection of the image light via the swing mechanism 60 and thus adjusts the position of the display image 100.

As shown in FIG. 7, in the control device 5 in the second embodiment, a swing mechanism driver 20 is provided as a new component and a display direction controller 21 is provided instead of the display controller 19. The output from the display parameter calculator 17 is coupled to the swing mechanism driver 20, the display direction controller 21, and the projector 2.

The swing mechanism driver 20 drives the swing mechanism 60, based on the target display position calculated by the display parameter calculator 17, and thus controls the position of projection of the image light L, by the projector 2. The display direction controller 21 generates the image control signal SC1 and outputs the image control signal SC1 to the projector 2 in such a way that the image reproduced by the display image reproducer 18 is displayed as the display image 100 on the projection surface 200 in the state of facing the target display orientation, based on the target display orientation calculated by the display parameter calculator 17.

In the second embodiment, due to the face that the angle of incidence of the optical axis of the image light L incident on the projection surface 200 varies depending on the position on the projection surface 200, a keystone distortion may occur in the display image 100, depending on the display position of the display image 100. In order to restrain the occurrence of such a keystone distortion, the projector 2 in the second embodiment performs keystone distortion correction based on the target display position calculated by the display parameter calculator 17 and a preset correction coefficient. Also, due to the face that the projection distance differs between the center and the peripheries of the projection surface 200, the display image 100 may be blurred, depending on the position of projection. In order to restrain such blurring, the projector 2 may adjust the focus, based on the target display position calculated by the display parameter calculator 17 and a preset correction coefficient.

According to the second embodiment as described above, as in the first embodiment, the position and orientation of the display image 100 displayed on the projection surface 200 are adjusted to be an appropriate display position and orientation corresponding to the position of the user A when the user A taps the projection surface 200 according to a predetermined rule. Thus, even when the user A moves to another position along the edge or the side of the projection surface 200 after the display image 100 is displayed near the hand of the user A, the user A not only can easily continue to view the content of the display image 100 but also can easily execute a predetermined operation such as a page turning operation or a writing operation to the display image 100.

The technical scope of the present disclosure is not limited to the embodiments. Various modifications can be made without departing from the spirit and scope of the present disclosure.

For example, while an example where the position and orientation of the display image 100 are adjusted based on the picked-up image when the tap sound is detected twice within the first predetermined time period TA is described in the embodiments, the present disclosure is not limited to this example. The system may be configured in such a way that the position and orientation of the display image 100 are adjusted based on the picked-up image when the tap sound is detected once, or three times or more, within the first predetermined time period TA.

For example, while an example where the position and orientation of the display image 100 are not adjusted when the third tap sound is detected within the second predetermined time period TB from the detection of the second tap sound is described in the embodiments, the present disclosure is not limited to this example. The system may be configured in such a way that the position and orientation of the display image 100 are adjusted when the tap sound is detected twice within the first predetermined time period TA, regardless of whether the third tap sound is detected or not.

An image display system according to one aspect of the present disclosure may have the following configurations.

According to one aspect of the present disclosure, an image display system includes: a projector projecting image light; an image pickup element picking up an image of a projection surface; a detector detecting a target sound generated in an image pickup range of the image pickup element; and a controller controlling position or a orientation of a display image displayed on the projection surface by the image light. The controller performs an adjustment of the position or the orientation of the display image, based on the picked-up image of the projection surface acquired from the image pickup element, when the target sound is detected by the detector.

In the image display system according to the one aspect of the present disclosure, the controller may perform the adjustment based on the picked-up image when the target sound is detected a predetermined number of times within a first predetermined time period.

In the image display system according to the one aspect of the present disclosure, the controller may perform the adjustment based on the picked-up image when the target sound of a second time is detected within the first predetermined time period from the detection of the target sound of a first time.

In the image display system according to the one aspect of the present disclosure, the controller may not perform the adjustment when the target sound of a third time is detected within a second predetermined time period from the detection of the target sound of the second time.

In the image display system according to the one aspect of the present disclosure, the controller may acquire a frequency component included in a predetermined frequency band, of frequency components included in the sound detected by the detector, as the target sound.

In the image display system according to the one aspect of the present disclosure, the controller may recognize a time point when a volume of the target sound exceeds a predetermined threshold, as a time point when the target sound is detected.

In the image display system according to the one aspect of the present disclosure, the controller may perform the adjustment based on a difference image acquired from the picked-up image.

In the image display system according to the one aspect of the present disclosure, the controller may calculate a centroid position of the difference image and perform the adjustment based on the centroid position.

In the image display system according to the one aspect of the present disclosure, the controller may determine a position of a user based on a centroid position of the difference image and perform the adjustment based on a result of determining the position of the user.

In the image display system according to the one aspect of the present disclosure, the projector may have a projection direction changer changing a direction of projection of the image light, and the controller may control the direction of projection of the image light via the projection direction changer and thus perform the adjustment.

What is claimed is:

1. An image display system comprising:
   a projector which projects image light onto a projection surface;
   at least one camera which acquires at least one picked-up image by picking up at least one image of the projection surface;
   at least one microphone which detects a sound generated in an image pickup range of the camera;
   a display parameter calculator which calculates a position or an orientation of an image displayed on the projection surface by the image light, based on the at least one picked-up image; and
   a controller which controls the position or an orientation of an image displayed on the projection surface by the image light, when a target sound is detected,
   wherein the at least one picked-up image includes a first picked-up image and a second picked-up image, and
   the controller controls the position and the orientation of the image based on a positional relationship between a center line in a projection area and a centroid position of a difference image representing a difference between the first picked-up image and the second picked-up image.

2. The image display system according to claim 1, wherein
   the controller controls the position or the orientation of the image when the target sound is detected a number of times within a first time period.

3. The image display system according to claim 2, wherein
   the controller controls the position or the orientation of the image when the target sound of a second time is detected within the first time period from the detection of the target sound of a first time.

4. The image display system according to claim 3, wherein
   the controller does not control the position or the orientation of the image when the target sound of a third time is detected within a second time period from the detection of the target sound of the second time.

5. The image display system according to claim 1, wherein
   the controller acquires a frequency component included in a frequency band, of frequency components included in the sound, as the target sound.

6. The image display system according to claim 1, wherein
   the projector has a swing mechanism which changes a direction of projection of the image light, and
   the controller controls the position or the orientation of the image by controlling the direction of projection of the image light using the swing mechanism.

7. An image display method comprising:
   acquiring at least one picked-up image by picking up an image of a projection surface where image light is projected;
   detecting a sound generated in an image pickup range of the at least one picked-up image;
   calculating a position or an orientation of an image displayed on the projection surface by the image light, based on the at least one picked-up image; and
   controlling a position or an orientation of an image displayed on the projection surface by the image light, based on the picked up image; when a target sound is detected;
   wherein the at least one picked-up image includes a first picked-up image and a second picked-up image, and
   wherein the position and the orientation of the image are controlled based on a positional relationship between a center line in a projection area and a centroid position of the difference image representing a difference between the first picked-up image and the second picked-up image.

8. The image display method of claim 7, further comprising not controlling a position or orientation of an image displayed on the projection surface upon detecting a second sound and a third sound within a first and a second time period.

9. The image display method of claim 7, wherein controlling a position or an orientation of an image further comprises controlling a direction of a projection of the image light by controlling a swing mechanism on a projector.

* * * * *